Feb. 11, 1958  R. P. BALDWIN ET AL  2,823,376
STRINGER RADAR REFLECTIVE TOW TARGET
Filed May 28, 1956  2 Sheets-Sheet 1
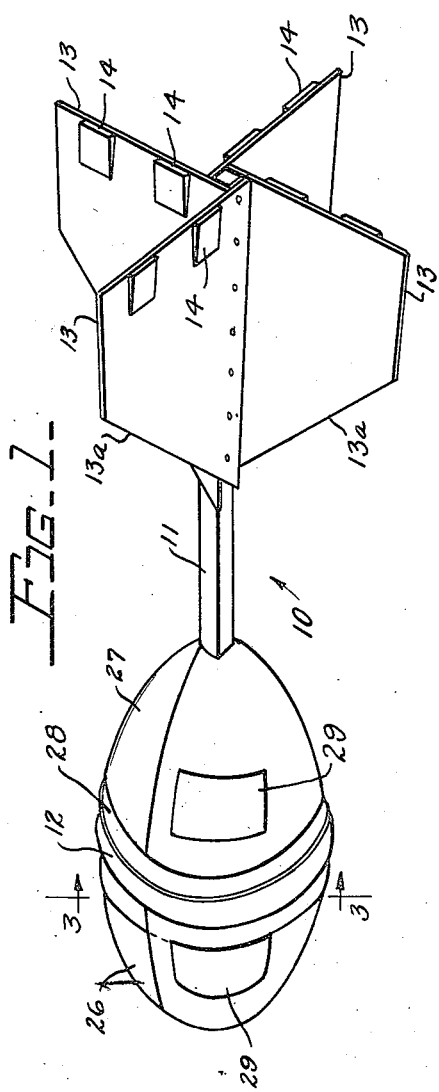
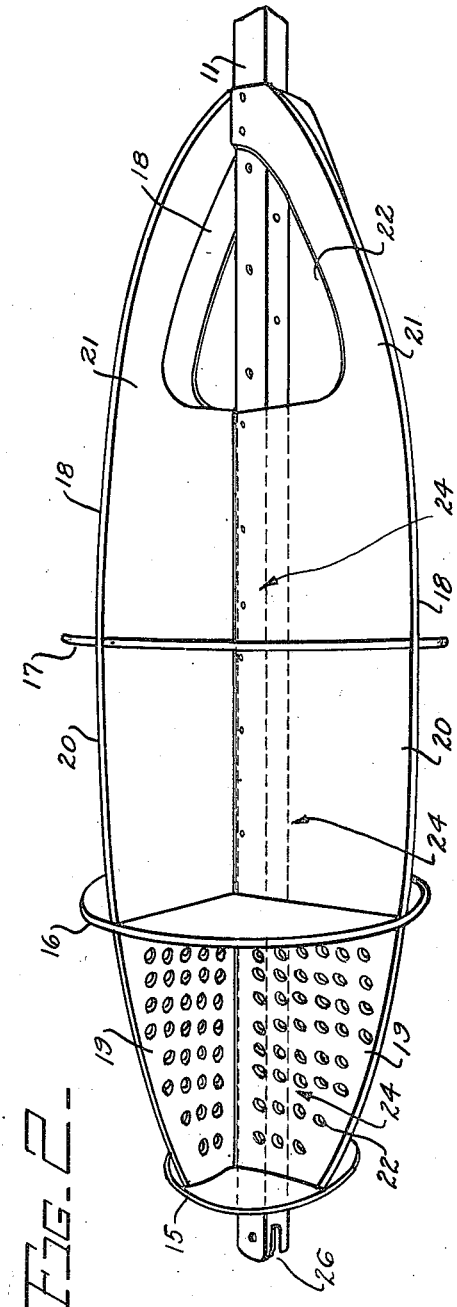
INVENTORS.
ROBERT P. BALDWIN
RAYMOND H. ECKERT
BY
ATTORNEYS

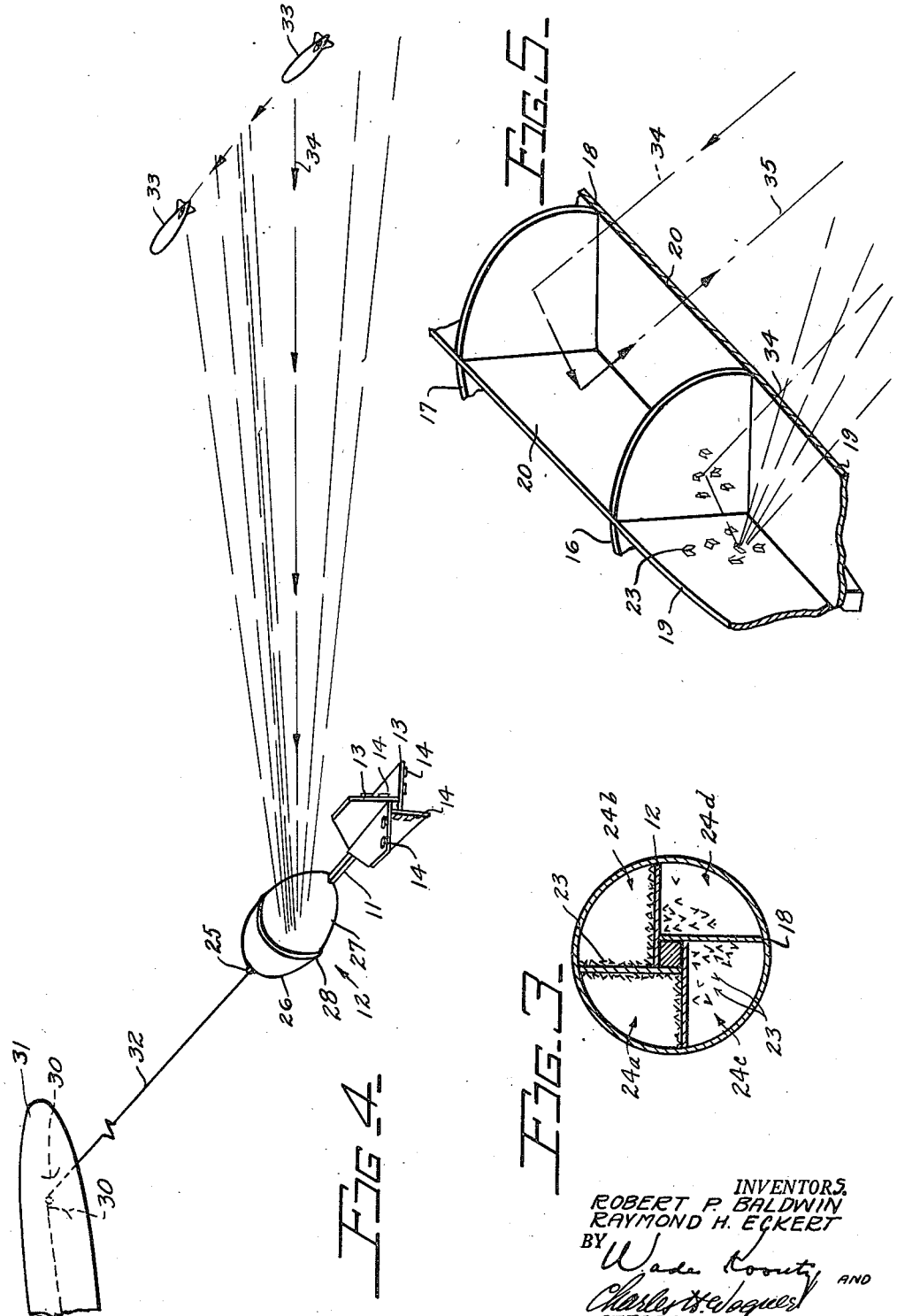

United States Patent Office 2,823,376
Patented Feb. 11, 1958

2,823,376

STRINGER RADAR REFLECTIVE TOW TARGET

Robert P. Baldwin and Raymond H. Eckert, Yuma, Ariz.

Application May 28, 1956, Serial No. 587,912

8 Claims. (Cl. 343—18)

(Granted under Title 35, U. S. Code (1952), sec. 266)

The invention described herein may be manufactured and used by or for the United States Government for governmental purposes without payment to us of any royalty thereon.

The present invention relates to certain improvements in radar reflective tow targets for high speed radar detection tracking operations wherein the improved target attains increased stability in flight in relation to its light weight and frangible structure and further relates to an apparatus and method of making the same for controlling the magnitude and dispersal of radar beams reflected from the tow target.

Certain difficulties have attended the use of lightweight streamlined targets in high speed tow target operations including the problem of instability caused by the turbulence developed in the slipstream in passing over the target which acts to deflect and toss the target. A lack of stability in the tow target not only is a source of danger to flight personnel in the towing aircraft but makes high speed tow target operations very difficult due to the unpredictable movements of the target once extended from the towing aircraft. Another difficulty is encountered in guided missile radar target operations wherein the radar beams of the missile tracking the tow target missile are normally returned as a more concentrated beam parallel to the direction of the radar beam striking the target. Since the missile is constantly moving at a high rate of speed it will often miss the reflected beam due to its incremental change in position during the time lapse between sending and receiving the signal. Therefore in missile target operations the problem has been an inability to increase the dispersal and magnitude of the reflected radar beams a sufficient amount to traverse the line of flight of the moving missile.

Further considerations involve cost and ease of manufacture of such targets due to the number of targets necessary to replace those damaged in target operations. It is consequently a primary object of the present invention to overcome the foregoing difficulties by providing a frangible, high speed target of lightweight construction, yet of greater stability than has been heretofore obtained.

It is another object to provide a frangible, streamlined tow target in which the reflective surfaces may be regulated to increase the dispersal and magnitude of the radar beams reflected from the surfaces.

Another object of the present invention is to provide a frangible tow target which can be utilized for night or day target operations for all radar systems employed in radar detection, tracking and gun-laying either from the air or from the ground.

Another object is to provide a combination of radar reflective surfaces conformable for use with any type of tow targets and capable of providing a radar return regardless of the strength and angle of approach to the target of the radar beam.

Another object is to provide an inexpensive radar reflective target which may be easily manufactured and assembled as required.

It is a further object to provide a lightweight, radar reflective tow target of optimum stability which may be safely extended rearwardly from a towing aircraft without danger of collision to the aircraft and which will further assume a consistent flight pattern once fully extended and at relatively great distances behind the towing aircraft.

It is still a further object of the present invention to provide a lightweight, frangible tow target which is conformable for use with all types of aircraft and adaptable for attachment at any desired point on the aircraft without imposing severe drag on the aircraft.

In order to attain the preceding objects and purposes and to overcome the difficulties as set forth, the improved target of the present invention is designed in such a way that the turbulent effect of the slipstream normally acting behind the reflective body portion to deflect the tail stabilizers is avoided by rearwardly displacing the stabilizers on a stringer member extending from the streamlined body of the target, and further causing rotation of the tow target about its longitudinal axis to thereby develop a moment of inertia tending to maintain the target in a level predictable flight pattern. In addition, chaff particles are associated with the reflective body portions and can be arranged in a number of different ways to achieve the desired dispersal and magnitude of the reflected radar beams. The above stated objects, as well as the novel features of the present invention, will become more apparent from the following detailed description thereof and from the accompanying drawings in which:

Figure 1 is a perspective view of a preferred form of radar reflective tow target;

Fig. 2 is a cutaway perspective view showing the internal framework of the body portion of the radar reflective tow target;

Fig. 3 is a cross sectional end view of the body portion taken along the lines 3—3 of Fig. 1;

Fig. 4 is a somewhat schematic view showing a guided missile tracking the radar reflective tow target in flight;

Fig. 5 is a fragmentary view of the internal framework comparing diagrammatically the reflection of the radar beams from the internal framework surfaces with the chaff particles associated with the reflective surfaces and without the chaff particles.

Referring more particularly to the drawings, there is shown in Figure 1 a radar reflective tow target 10 broadly comprising an elongated stringer or main support 11 extending the length of the target 10, an oval shaped shell or body portion 12 forming the main target portion and enclosing the stringer 11 at the forward end thereof, and four tail stabilizer fins 13 rearwardly displaced from the shell 12 and spaced at 90° angles in radial fashion about the rearward end of the stringer 11.

Each of the tail stabilizers or fins 13 may be conveniently attached to the rearward end of the stringer 11 by securing the inner edge of each fin to a side of the rectangular stringer. Each fin is streamlined by tapering the forward edge 13a rearwardly as shown in Figure 1. The spin wedges or tabs 14 are fastened to the trailing edge of each stabilizer and spaced thereon at equal distances on a common side of each stabilizer. By varying the number of spin wedges 14 the rate of rotation of the target 10 can be either increased or decreased, each wedge extending slightly outwardly and rearwardly along the trailing edge of the stabilizer surface so that the slipstream striking the angular face of each wedge will tend to cause a rotational or spinning movement of the tail stabilizers and body portion about the stringer axis.

Fig. 2 illustrates the inner framework for the shell 12 made up of a front bulkhead 15, a center bulkhead 16, and a rear bulkhead 17, each bulkhead being in the form of a circular disk and having a central opening for slidable placement on the elongate stringer 18. The respective bulkheads 15, 16, and 17 are positioned transversely across the forward end of the stringer at the front, center, and rear portion thereof, respectively. Four longitudinal formers 18 are secured to a side of the elongate stringer 11, the outer edge of each former curving rearwardly and outwardly from the front bulkhead 15 to the rear bulkhead 17, then curving inwardly and rearwardly for connection to the middle section of the stringer 11. Each of the formers 18 is made up of front former sections 19 interconnecting the front and center bulkheads 15 and 16, center former sections 20 interconnecting the center and rear bulkheads 16 and 17, and rear former sections 21 interconnecting the rear bulkhead 17 and stringer 11. To regulate the center of gravity and to make the tow target as light as possible, openings 22 are formed as shown on the front former 18 and rear former 21 so that the strength of the mutually supporting bulkheads and formers will not be lessened.

Together with suitable radar reflective material (not shown), such as tin foil which is coated on the inner framework, additional radar reflectivity is acquired in a novel manner by the application of chaff 23 to the formers and bulkheads of the target. The term "chaff" as applied herein refers to any material capable of providing a radar return after the material has been shaped and cut to a wavelength or wavelengths which react to airborne or ground radar in a manner to provide a radar return. As more clearly shown in Fig. 3 in cross section, the chaff particles are small angular strips cut to multiples of a one-quarter wavelength so as to be in resonance with the wavelength of the radar beam and can either be secured to the formers and bulkheads in varying angular disposition as in compartments 24a and 24b, or merely distributed loosely throughout the framework as in compartments 24c and 24d formed by the intersecting bulkheads and formers and inclosed therein by the outer shell 12. Solid reflecting surfaces or strips 29 are placed over the shell 12, as illustrated in Fig. 1 to partially block the dispersed reflection from the chaff strips and reflective surfaces. The solid surfaces 29 may be formed by use of a paint, as shown, applied at the required position or a separate surface attached to the shell, either type being radar reflective.

The tow target is assembled by first installing a swivelled tow support tab 25 into a slot 26 provided at the forward end of the stringer 11. The front formers 19 are then attached to the stringer slightly behind the slot 25 and the front bulkhead 15 to slide into place in front of the formers 19. In succession, the center bulkhead 16 and center formers 20 are then attached followed by the rear bulkhead 17 and rear formers 21. In our preferred form, reflective material is then coated over the formers and bulkheads, and the chaff particles 23 are interspersed or secured within each of the compartments 24. A front cone and rear cone 27 are passed over the stringer 11 and inner framework to inclose the scattered chaff particles, the cones being secured together by means of tape 28 to form the outer shell 12. The spin tabs 15 are then attached to the fins and the fins selectively positioned a predetermined distance behind the target shell 12.

The inner framework, tail stabilizers, and the stringer are composed of light wood material such as plywood or pine and the outer shell is formed of light, transparent plastic sheeting which is receptive to radar and will provide a frangible structure which will rupture in the event of collision or contact with missiles or aircraft. The target framework and shell may also be constructed of a light plastic material in place of the wood structure of our preferred form, and the stringer formed of fiber glass.

In operation, the target is secured to a towing aircraft by clamping the target within struts 30 suspended from the under surface of the extremity of the wing 31, as shown in Fig. 4. The swivelled tab 25 is then secured to a light tow line 32 preferably of nylon composition, which holds the tow target in place within the struts. By suitable release means (not shown) provided on the towing aircraft, the tow target is released by slackening the tow line and permitting the target to be forced rearwardly from the struts by the force of the slipstream. Upon release and rearward extension of the tow target from the aircraft, the force of the slipstream against the angular surface of the spin wedges will cause the target to rotate about the stringer axis. The turbulence developed in the slipstream in passing over the streamlined contour of the shell 12 will have subsided upon reaching the stabilizers and will exert a steady striking force against the angular faces of the spin wedges thereby reducing any tossing or whiplash of the stabilizer surfaces. The spinning target will, of course, rotate about the swivelled tow support tab independently of the tow line and will set up a moment of inertia about the stringer axis acting to resist any deviation of the tow target from its original directional course.

In guided missile or other airborne radar operations in which the radar is installed in a guided missile or aircraft 33 causing the angle of approach of the radar beams with respect to the tow target to constantly change as illustrated in Fig. 4 it becomes necessary for the tow target to be capable of dispersing the radar beam. Without such dispersion, the radar beam 34 striking the intersecting framework surfaces will be returned in the form of a concentrated beam 35 in the same direction as the beam striking the surface while at the same time the guided missile will have varied its position during the incremental time lapse between the transmission and return of the beam and therefore will often fail to receive the return beam as in Fig. 5. By dispersing the return beam 34 by means of the chaff 23 so that the radar screen can pick up the beam over a wider area, an image will be received by the radar notwithstanding its change in position with respect to the target. Where the chaff particles are loosely distributed within the shell compartments 24, the rotating tow target will cause a constant tumbling or shifting action of the chaff particles within the shell thereby constantly varying the angle and position of each chaff particle. As the radar beams are impinged on the reflective surface of the inner framework, the varying attitude and disposition of the chaff particles caused by the rotating target will cause a reflection of the radar beam over a wide area. The radar beam impinged on the reflective surfaces and chaff particles will be conducted and reflected with little resistance loss due to the resonant quality of the chaff; in this way, it is possible to return a relatively high strength beam over a widely dispersed area. Of course, when the chaff particles are loosely distributed within the outer shell no definite pattern of dispersion will be set up; however, the number of chaff particles, together with the reflective framework surfaces will be sufficient to insure adequate dispersion in the direction of the radar screen.

In fastening the chaff strips to the framework surfaces the direction of dispersion of the radar return can be more accurately controlled, and is further controlled by partially blocking out the chaff effect by means of the solid reflecting surfaces or strips 29 placed advantageously over the shell. By partially blocking radar reflection from the chaff it is thereby possible to vary the strength and return of the radar beam for different angles of approach to the target to simulate the approach toward an actual target.

The frangible tow targets can also be utilized for night training missions by composing the shell or body of the target of light transparent material as described and installing lights within the target powered by small dry cell batteries. This is advantageous in the interest of safety in that the target can be located visually at night for night radar intercept operations and will permit visual tracking from the ground.

While we have disclosed a preferred embodiment of our invention, it is obvious that certain modifications may be made, as for instance, in the specific materials described or the distribution of chaff particles within the shell, without departing from the spirit of the invention as described in the appending claims.

We claim:

1. A radar reflective tow target adapted to be towed at high speeds behind an aircraft in flight comprising: a main support member for attachment to a tow line extending from the aircraft, a streamlined, shaped radar reflective body enclosing the forward portion of said support, with said support disposed along the longitudinal axis of said body and a plurality of stabilizer members displaced rearwardly with respect to said body in radial disposition about said support thereby maintaining increased stability and balance in flight.

2. The tow target according to claim 1 in which spin means are associated with said target to rotate said target about its longitudinal axis whereby said target is urged to maintain a fixed direction in flight.

3. In a radar reflective tow target wherein a streamlined radar reflective body portion is provided for high speed towing in radar detection tracking operations, the combination with said body portion of a support member rearwardly extending therefrom and a plurality of stabilizer surfaces selectively positioned on said support a predetermined distance behind said body to avoid the turbulence developed in the slipstream in passing over the said body.

4. The tow target according to claim 3 in which said stabilizer surfaces are radially disposed about said support, each stabilizer provided with an angular surface extending rearwardly in a common direction to induce rotation of said target about its longitudinal axis.

5. A frangible tow target for high speed radar detection operations comprising, in combination: an elongate stringer attached to a lightweight tow line extending from the towing aircraft; an inner framework formed at the forward end of said stringer having a plurality of transverse circular bulkheads spaced therealong and a plurality of longitudinal formers interposed between said bulkheads; an elongate streamlined outer shell enclosing said framework, said framework having radar reflective surfaces; and a plurality of tapered stabilizer fins rearwardly displaced from said shell in radial disposition about said stringer, each fin provided along its trailing edge with a plurality of spin surfaces extending rearwardly and outwardly in a common direction into the slipstream to introduce a rotational motion in said target about the stringer axis, said spin surfaces and said fins cooperating to produce optimum stability and increased radar reflectivity of said tow target.

6. A radar reflective tow target for towing at high speeds behind an aircraft in flight comprising: a central elongated support member; a shell disposed at the forward end thereof and radar reflective chaff interspersed within said shell; a plurality of stabilizer members spaced about said support and displaced rearwardly from said shell, and spin means associated with said target to cause rotation of said target about its longitudinal axis whereby said target is urged to maintain a fixed direction in flight and said chaff is tumbled within said shell to disperse the radar beams striking said target.

7. A frangible radar reflective tow target adapted to be connected in swivelled connection to an aircraft tow line so as to rotate independently of said line when extended from a towing aircraft in high speed radar detection operations, said tow target comprising, in combination: an elongate stringer, a radar reflective frame having a series of bulkheads of graduated size spaced across the forward end of said stringer and a plurality of curved longitudinal formers radially disposed about said stringer at the forward end thereof to intersect said bulkheads; a streamlined shell housing said frame to form a series of enclosed compartments with said intersecting bulkheads and formers; chaff particles interspersed within each compartment; a plurality of stabilizer tail surfaces radially disposed about the rearward end of said stringer selectively positioned a predetermined distance behind said shell to avoid the turbulent effect of the slipstream passing over said shell; and a plurality of spaced spin wedges extending rearwardly and outwardly in a common direction along the trailing edge of each stabilizer to cause rotation of said target and scattering of said chaff in each compartment whereby said target tends to maintain a fixed direction in flight and radar beams traversing said chaff and said target framework are dispersed over a wide range to thereby increase the area of detection of the radar beams.

8. A radar reflective tow target adapted to be towed at high speeds behind an aircraft in flight, comprising a main support member for attachment to a towline extending from the aircraft, a radar reflective body associated with said support, a plurality of stabilizer members displaced rearwardly with respect to said body in radial disposition about said support, spin means associated with said target to rotate said target about its longitudinal axis, and radar reflective strips disposed for rotation by said spin means whereby the radar beam reflected from said target is scattered over a wide area.

References Cited in the file of this patent

UNITED STATES PATENTS

| | | |
|---|---|---|
| 2,419,549 | Griesinger | Apr. 29, 1947 |
| 2,545,496 | Short | Mar. 20, 1951 |
| 2,667,351 | McKinney | Jan. 26, 1954 |
| 2,752,594 | Link et al. | June 26, 1956 |